United States Patent
Fulton et al.

(10) Patent No.: US 9,239,020 B2
(45) Date of Patent: Jan. 19, 2016

(54) CONDENSATE ACCUMULATION MODEL FOR AN ENGINE HEAT EXCHANGER

(71) Applicant: Ford Global Technologies, LLC, Dearborn, MI (US)

(72) Inventors: Brien Lloyd Fulton, West Bloomfield, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 628 days.

(21) Appl. No.: 13/653,224

(22) Filed: Oct. 16, 2012

(65) Prior Publication Data

US 2014/0102428 A1     Apr. 17, 2014

(51) Int. Cl.
| | |
|---|---|
| F02M 25/07 | (2006.01) |
| F02D 41/04 | (2006.01) |
| F02D 21/08 | (2006.01) |
| F02B 29/04 | (2006.01) |
| F02M 35/08 | (2006.01) |
| F02D 13/02 | (2006.01) |
| F02D 41/14 | (2006.01) |
| F02D 41/00 | (2006.01) |

(52) U.S. Cl.
CPC ............ *F02D 21/08* (2013.01); *F02B 29/0468* (2013.01); *F02D 41/0055* (2013.01); *F02M 25/0701* (2013.01); *F02M 25/0707* (2013.01); *F02M 25/0709* (2013.01); *F02M 25/0732* (2013.01); *F02M 35/088* (2013.01); *F02D 13/0203* (2013.01); *F02D 41/0062* (2013.01); *F02D 2041/1472* (2013.01); *F02D 2200/0418* (2013.01); *F02M 25/0753* (2013.01); *Y02T 10/146* (2013.01); *Y02T 10/47* (2013.01)

(58) Field of Classification Search
CPC .............. F02M 25/07; F02M 25/0707; F02M 25/0709; F02M 25/0732; F02D 41/04; F02D 41/0055; F02D 41/0062; F02D 2041/1422; F02B 29/04; F02B 33/44; F02B 29/0402; F02B 29/0493; F02B 29/0425; F02B 29/0437; F02B 2029/0487

See application file for complete search history.

(56) References Cited

U.S. PATENT DOCUMENTS

| | | | | |
|---|---|---|---|---|
| 6,367,256 | B1* | 4/2002 | McKee | 123/568.12 |
| 6,681,171 | B2* | 1/2004 | Rimnac et al. | 701/108 |
| 7,886,724 | B2* | 2/2011 | Tai et al. | 123/542 |
| 2009/0050117 | A1 | 2/2009 | Tai et al. | |
| 2014/0102424 | A1* | 4/2014 | Norman | 123/542 |

FOREIGN PATENT DOCUMENTS

WO    WO 02077428 A1 * 10/2002 .............. F02B 33/44

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Embodiments for controlling condensate in an engine heat exchanger are disclosed. In one example, a method for an engine comprises increasing exhaust gas recirculation (EGR) flow responsive to condensation in an EGR cooler. In this way, condensate in the EGR cooler may be controlled via modulation of EGR flow.

19 Claims, 5 Drawing Sheets

CONDENSATE ACCUMULATION MODEL FOR AN ENGINE HEAT EXCHANGER

FIELD

The present disclosure relates to internal combustion engines.

BACKGROUND AND SUMMARY

Engine heat exchangers, such as charge air coolers and other coolers, may function to cool the temperature of charge air entering the intake manifold, providing charge air with higher density and thus increased engine power and improved fuel efficiency. Further, cooled charge air may lower combustion temperatures and aid in controlling certain engine emissions. However, under certain conditions, such as when the air in the heat exchanger is cooled below its dew point, condensate can form within the heat exchanger. The condensate may accumulate and then be swept to the engine, causing misfire and other problems; it can also reduce the effectiveness of the heat exchanger over time. Further, particularly in exhaust gas recirculation coolers which cool exhaust being recirculated back to the intake, acidic compounds may be present in the condensate, resulting in degradation to the cooler and/or downstream components.

To prevent the accumulation of condensate within the heat exchanger, a bypass line may be provided around the heat exchanger. During conditions in which condensate is predicted to form in the cooler, the air normally provided to the heat exchanger may be routed through the bypass line to avoid possible deposition of condensate within the heat exchanger. However, such bypass lines may be expensive and increase the complexity of the engine control system strategy. Further, it may be difficult to accurately predict when condensation may form, resulting in unnecessary bypass of the air and increased temperature and decreased density of the charge air.

The inventors have recognized the issues with the above approach and offer a method to at least partly address them. In one embodiment, a method for an engine comprises increasing exhaust gas recirculation (EGR) flow responsive to condensation in an EGR cooler.

In this way, the flow of EGR may be increased in response to condensation in an EGR cooler. In one example, the EGR flow may be increased when an estimated amount of accumulated condensate in the EGR cooler exceeds a threshold. The amount of accumulated condensate in the EGR cooler may be estimated based on both an amount of condensation that forms within the EGR cooler, as well as an amount of condensate that evaporates out of the EGR cooler over a given duration. By tracking both the amount of formed condensate as well as the amount of evaporated condensate, the amount of condensate that actually accumulates in the heat exchanger may be more accurately determined. Further, by adjusting EGR flow responsive to condensation in the cooler, condensate may be removed without utilizing a complicated bypass system, or in addition to such a bypass system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
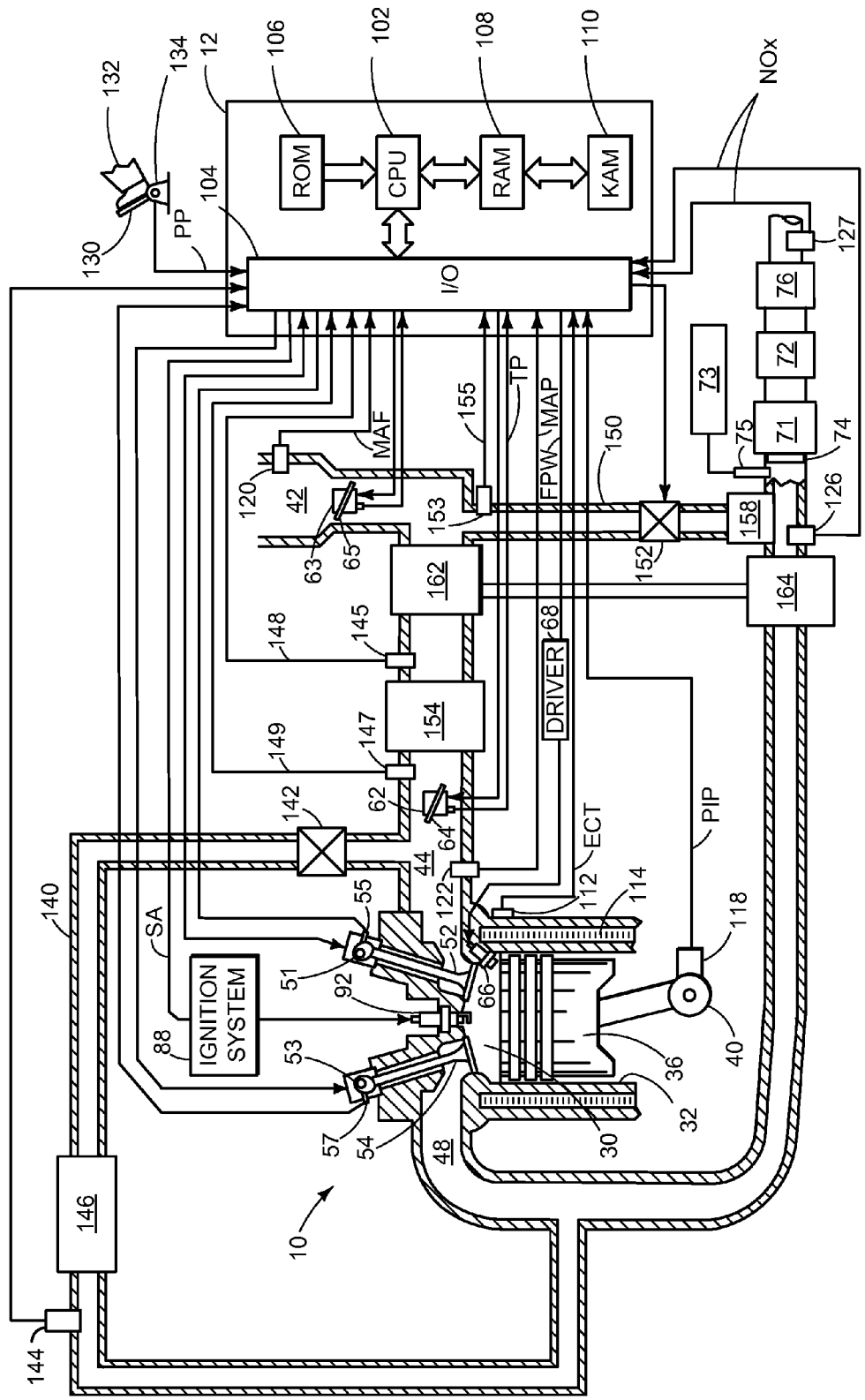
FIG. 1 shows a schematic diagram of an embodiment of an engine with a turbocharger and an exhaust gas recirculation system.

Engine heat exchangers, such as EGR coolers and charge air coolers, may accumulate condensate under some conditions. The accumulated condensate may be swept to the engine, where if it is present in large amounts, may cause misfire and other combustion issues or component damage. In order to prevent the accumulation of condensate within an engine heat exchanger, the amount of formed and evaporated condensate within the heat exchanger may be tracked using a condensation model. The condensation model may output formed and evaporated condensate based on speed and load dependent operating parameters, such as EGR rate, boost pressure, and mass air flow. If the condensate in the heat exchanger accumulates to a threshold level, an engine actuator may be adjusted to remove the condensate from the heat exchanger. FIG. 1 illustrates an engine including multiple heat exchangers and a controller configured to execute the methods illustrated in FIGS. 2-5.

Referring now to FIG. 1, it shows a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside combustion chamber 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may open and close according to lobes of intake cam 51. Similarly, exhaust valve 54 may open and close according to lobes of exhaust cam 53. Phase of intake cam 51 and exhaust cam 53 may be varied with respect to crankshaft 40. Alternatively, the variable valve actuator may be electro hydraulic or any other conceivable mechanism to enable valve actuation. During some conditions, controller 12 may vary the signals provided to actuators coupled to intake cam 51 and exhaust cam 53 to control the opening and closing timing of the respective intake and exhaust valves. The position of intake valve 52 and exhaust valve 54 may be determined by valve position sensors 55 and 57, respectively. In alternative embodiments, one or more of the intake and exhaust valves may be actuated by one or more electrical actuators, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30, for example in order to control NOx production. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one embodiment, the exhaust gas sensor 126 may be a NOx sensor configured to provide an indication of engine out NOx levels, e.g., NOx levels in the exhaust downstream of the engine and upstream of any emission control devices.

Emission control devices 71, 72, and 76 are shown arranged along exhaust passage 48 downstream of exhaust gas sensor 126. In the depicted embodiment, device 71 may be a selective catalytic reduction (SCR) system, while devices 72 and 76 may be a diesel oxidation catalyst (DOC), diesel particulate filter (DPF), three way catalyst (TWC), $NO_x$ trap, various other emission control devices, or combinations thereof. For example, device 72 may be a DOC and device 76 may be a DPF. In some embodiments, DPF 76 may be located downstream of SCR 71 and DOC 72 (as shown in FIG. 1), while in other embodiments, DPF 76 may be positioned upstream of DOC 72. Alternative arrangements are also possible in some embodiments, such as DOC 72 and/or DPF 76 being arranged upstream of SCR 71. If device 71 is an SCR system, a reductant tank 73 may be present to store reductant, such as urea or $NH_3$. The tank 73 may be coupled to an injector 75 to inject reductant into the exhaust upstream of the device 71 or into the device 71 in order to reduce NOx in the device 71. Further, a mixer 74 may be provided to ensure adequate mixing of the reductant within the exhaust stream. Urea may be injected in proportion to an amount of engine feedgas NOx entering the SCR. An additional NOx sensor 127 may be present downstream of the devices 71, 72 and 76 to provide an indication of the efficiency of the devices, by comparing the downstream NOx reading from sensor 127 to the upstream NOx reading from sensor 126.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
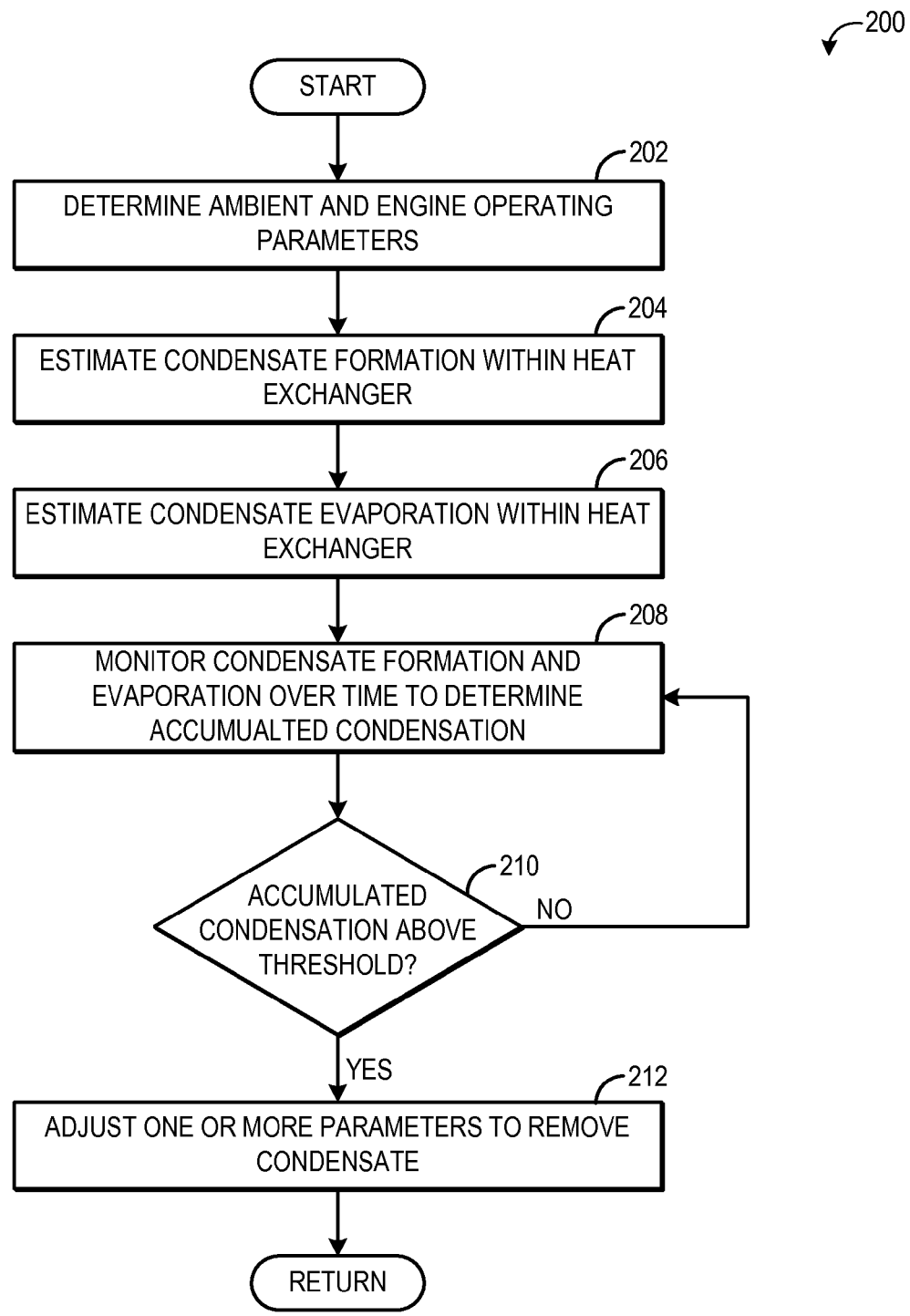
FIG. 2 shows a high level flow chart illustrating a method for detecting and removing condensate from an engine heat exchanger according to an embodiment of the present disclosure.

Turning now to FIG. 2, a high-level method 200 for controlling condensate accumulation in an engine heat exchanger is illustrated. Method 200 may be carried out by an engine controller, such as controller 12, according to instructions stored thereon. The heat exchanger may be an EGR cooler (such as cooler 146 or 158), a charge air cooler (such as cooler 154), or other heat exchanger.

Method 200 includes, at 202, determining ambient and engine operating parameters. The ambient operating parameters may include humidity, temperature, and pressure of air entering the intake system of the engine. The engine operating parameters may include engine speed and load, EGR rate, mass air flow rate, boost pressure, intake air temperature at the inlet of the heat exchanger, air-fuel ratio, and other parameters.

At 204, the amount of condensate formed within the heat exchanger is estimated. The amount of formed condensate may be determined using a condensation model that estimates condensate formation as a function of moisture content of the air entering the heat exchanger and conditions of the heat exchanger, including pressure, temperature, and mass flow rate of the air through the heat exchanger. Additional details regarding estimating the amount of formed condensate will be provided below with respect to FIG. 3.

At 206, the amount of condensate evaporated within the heat exchanger is estimated. Similar to the amount of formed condensate, the amount of evaporated condensate may be determined using the condensation model. The amount of evaporated condensate may be a function of mass air flow through the heat exchanger, temperature at the outlet of the heat exchanger, and pressure of the heat exchanger. Further, the amount of evaporated condensate may also include the condensate in the heat exchanger that has been entrained with the air flowing through the exchanger. Additional details regarding estimating the amount of evaporated condensate will be provided below with respect to FIG. 4.

At 208, the amount of formed condensate and evaporated condensate with the heat exchanger is monitored in order to determine an estimated accumulated condensate amount. At 210, it is determined if the accumulated condensate amount is above a threshold. The threshold may be a suitable threshold. In one example, the threshold may be zero, such that any amount of accumulated condensate may be over the threshold. In other examples, the threshold may be greater than zero so that a small amount of accumulated condensate is tolerated, but the threshold may be lower than the amount of condensate that will cause misfire and other engine problems if directed to the engine. If the accumulated condensate is not above the threshold, method 200 proceeds back to 208 to continue to monitor the condensate formation and evaporation.

If the accumulated condensate is above the threshold, method 200 proceeds to 212 to adjust one or more operating parameters to remove the condensate and/or prevent future accumulation of the condensate within the heat exchanger. For example, if the heat exchanger is an EGR cooler, the EGR valve that regulates the amount of exhaust recirculated to the intake may be opened to increase the amount of EGR flowing through the cooler. In another example, if the heat exchanger is a charge air cooler, the EGR valve, the throttle, turbocharger wastegate, and/or compressor bypass valve may be adjusted to change the velocity, mass air flow rate, temperature, etc., of the intake air through the charge air cooler. In a further example, the amount of coolant flowing to the EGR cooler or charge air cooler may be adjusted to increase the temperature of the EGR cooler or charge air cooler. For example, a coolant bypass or flow metering valve may be present in the coolant flow line leading to the EGR cooler and/or charge air cooler, and this valve may be closed to reduce coolant flow to the respective cooler. Adjusting operating parameters in response to accumulated condensate above the threshold will be explained in further detail below with respect to FIG. 5.

Figure 3:
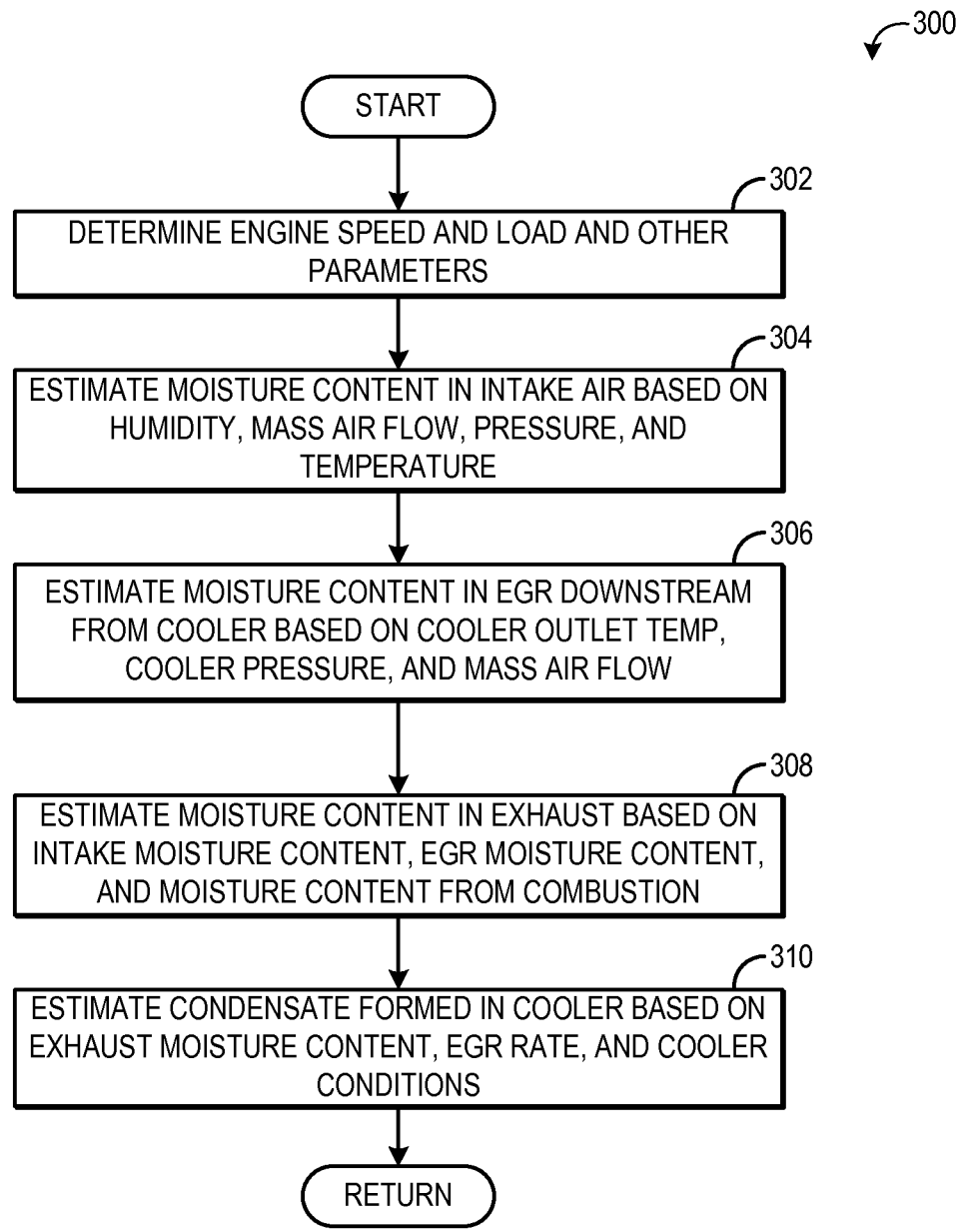
FIG. 3 shows a flow chart illustrating a method for estimating an amount of formed condensate within an EGR cooler according to an embodiment of the present disclosure.
Figure 4:
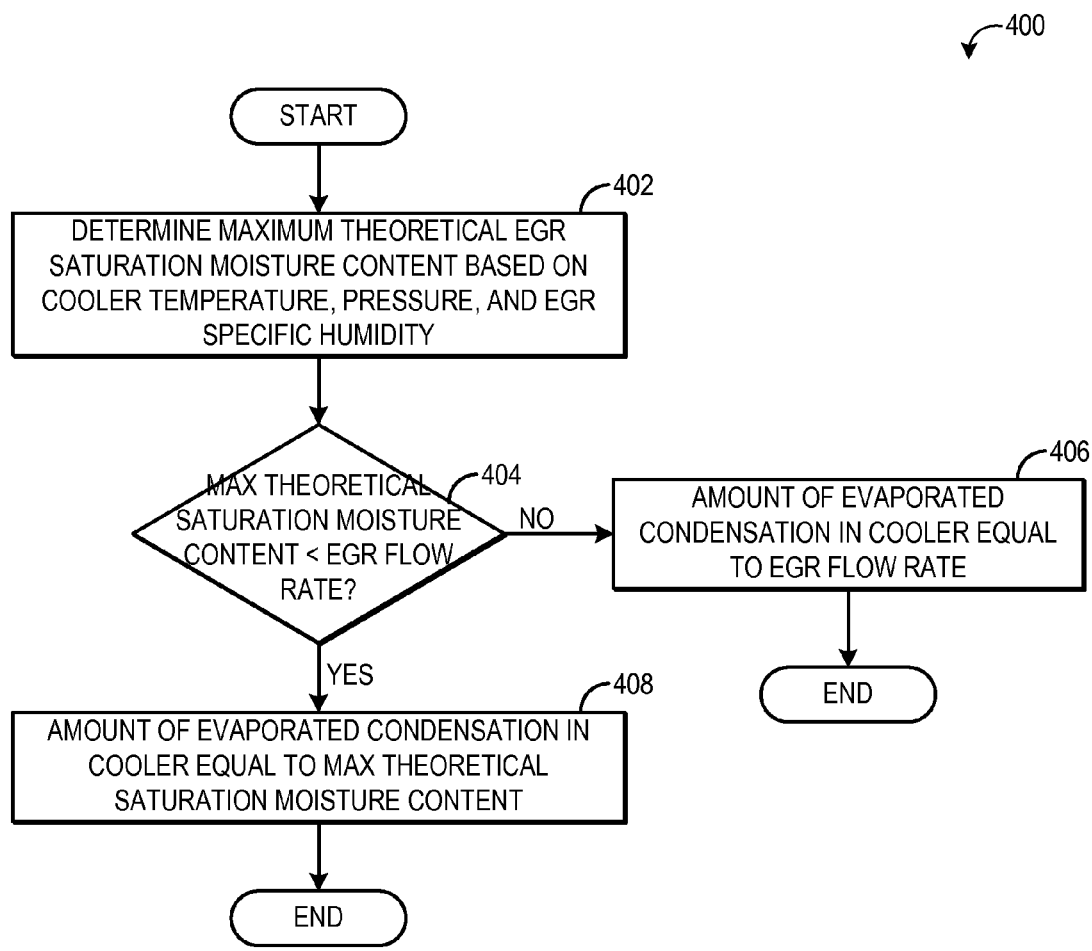
FIG. 4 shows a flow chart illustrating a method for estimating an amount of evaporated condensate within an EGR cooler according to an embodiment of the present disclosure.
Figure 5:
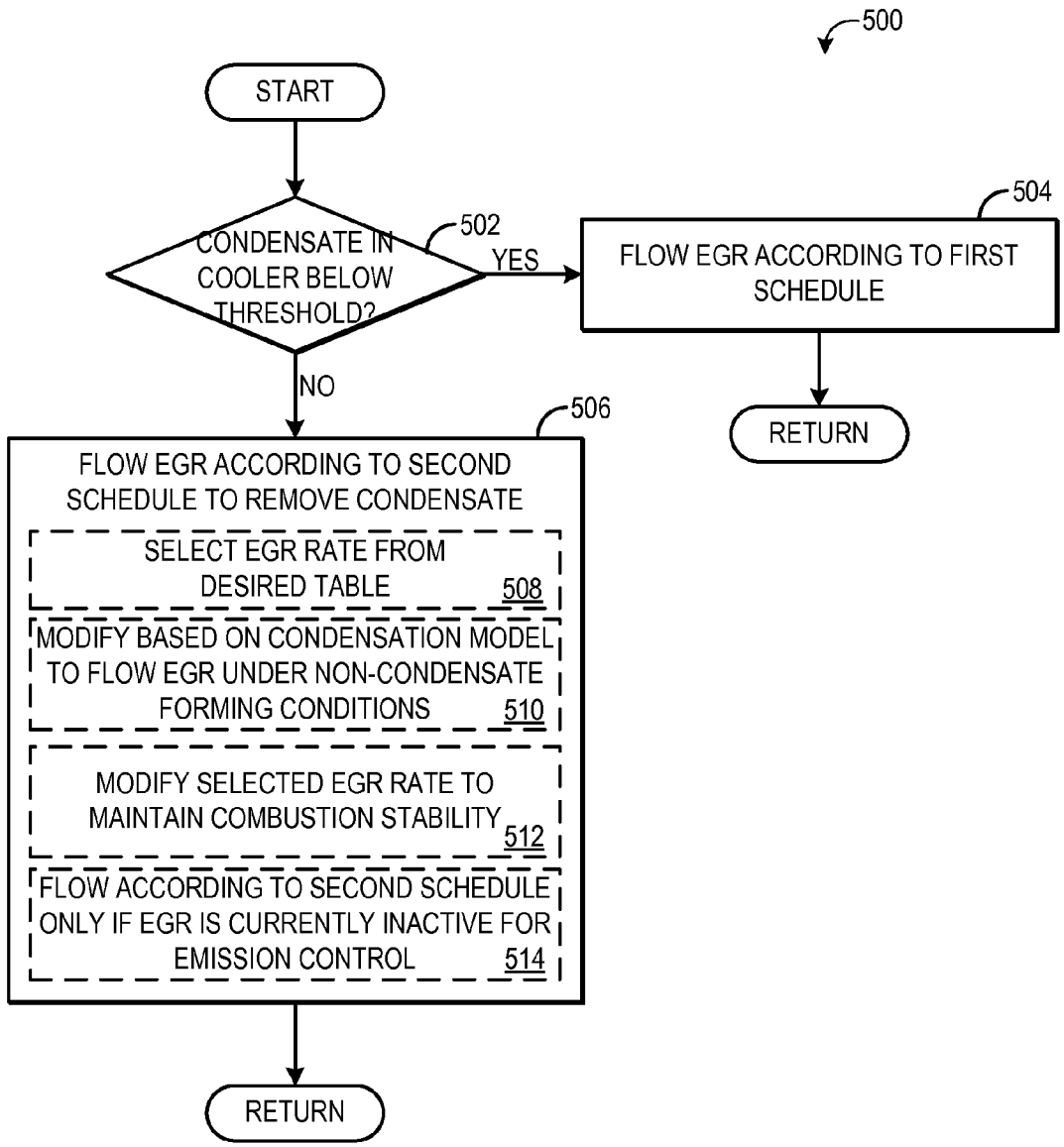
FIG. 5 shows a flow chart illustrating a method for removing condensate within an EGR cooler according to an embodiment of the present disclosure.

FIGS. 3-5 are flow charts illustrating various methods for controlling condensate accumulation in an EGR cooler. While the methods illustrated in FIGS. 3-5 may be applied to other heat exchangers (e.g., charge air coolers), some details of the methods are specific to the type of heat exchanger to which the method applies, and hence the below methods are explained relative to an EGR cooler. Additional detail regarding applying the below methods to a charge air cooler will also be presented. Referring now to FIG. 3, it illustrates a method 300 for estimating the amount of condensate formed within an EGR cooler using a condensation model. Method 300 may be carried out by controller 12 in order to determine an amount of formed condensate within the EGR cooler at a given time point. As explained above with respect to FIG. 2, the amount of formed condensate at each calculated time point may be monitored over a given duration to determine how much condensate has accumulated in the EGR cooler.

Method 300 includes, at 302, determining engine speed and load and other parameters. The amount of formed condensate in the EGR cooler is speed and load dependent, as multiple factors that affect condensation, such as EGR rate, are scheduled based on speed and load. Additional parameters that may be determined include ambient humidity, mass air flow, boost pressure, EGR cooler inlet temperature, etc. At 304, the moisture content of the intake air entering the engine is determined based on humidity, mass air flow, pressure, and temperature of the intake air. In one example, the moisture content of the intake air may be determined based on the following equation:

$$MC_{in} = \text{SpecificHumidity} * MAF$$

Specific humidity may be calculated using the equation:

$$\text{SpecificHumidity} = 0.622 \left( \frac{Pv}{P - Pv} \right)$$

Where P is the intake air vapor partial pressure, which may be determined from a graph of water saturation plotting pressure vs. intake air temperature.

At 306, the moisture content of EGR downstream of the EGR cooler is estimated based on EGR cooler outlet temperature, EGR cooler pressure, and mass air flow. In one example, the moisture content of the EGR downstream of the cooler may be determined using the equation:

$$MC_{EGR} = MAF * 0.622 * P + 3.07 \times 10^2 (T_{outlet}) + 6.47 / (\text{CoolerPressure} - P)$$

where, similar as above, P is the water vapor partial pressure determined as a function of EGR cooler outlet temperature. The EGR cooler pressure may be equal to the boost pressure (if the EGR valve is located upstream on the hot side of the cooler), or it may be equal to 1.2*boost pressure (if the EGR valve is located downstream on the cold side of the cooler). The EGR cooler outlet temperature may be determined based on the equation:

$$T_{out} = T_{in} - e * (T_{in} - T_{coolant})$$

Where $T_{in}$ is the temperature of the inlet of the cooler (measured by a sensor), e is the cooler effectiveness as a function of mass air flow, as supplied by the manufacturer of the cooler, and $T_{coolant}$ is the temperature of the coolant in the cooler.

At 308, the moisture content of the exhaust is estimated based on the total of the moisture content of the intake air, moisture content of the EGR, and moisture produced during combustion. The moisture produced during combustion is determined using the equation:

$$MC_{combustion} = fuelflow * \left( \frac{\text{kg } H_2O}{\text{kg fuel}} \right)$$

The fuel flow may be determined by dividing mass air flow by air-fuel ratio, and kg ($H_2O$)/kg (fuel) is a function of the air-fuel ratio and composition of the fuel. For example, at an air-fuel ratio of 14.5, 1 kg of diesel fuel will produce 1.174 kg $H_2O$. In other embodiments, the moisture content of the exhaust may be estimated based on the exhaust air-fuel ratio. In still further embodiments, an exhaust gas sensor (such as sensor 126 of FIG. 1) may be used to determine the humidity, and thus the moisture content, of the exhaust.

At 310, the amount of condensate formed in the cooler is estimated based on the above-determined exhaust moisture content and EGR rate. As only a portion of the exhaust is routed to the EGR cooler, the exhaust moisture content multiplied by the EGR rate provides an estimation of the moisture content of the EGR entering the cooler. Further, in some embodiments, the amount of condensate formed within the cooler may also be determined based on cooler conditions, such as the temperature of the cooler, mass air flow through the cooler, pressure of the cooler, etc.

Thus, method 300 of FIG. 3 provides for estimating the amount of formed condensate within an EGR cooler. The amount of formed condensate may be determined from various speed and load dependent inputs, including EGR rate, mass air flow rate, gas temperature at the inlet of the EGR cooler, boost pressure, and air-fuel ratio, as well as speed-load independent inputs including the specifications of the cooler (e.g., effectiveness), temperature of the coolant in the cooler, and humidity of the air. The condensation model used to estimate the amount of formed condensate is based in part on the amount of EGR flowing through the cooler. However, even if EGR is deactivated (e.g., the EGR valve is in a fully closed position), it may be assumed that a small amount of EGR is able to pass by the EGR valve. There is also a leak amount associated with the bypass and small amounts or EGR can leak through the bypass into the cooler and condensate over time. Thus, even if the EGR rate is set to zero, the condensation model may use a preset, small amount of EGR to estimate the amount of formed condensate.

As explained previously, method 300 is described here as determining the amount of formed condensate in an EGR cooler. However, the method may be used to determine the amount of condensate formed in a different heat exchanger, such as a charge air cooler. The amount of formed condensate in the charge air cooler is not affected by the moisture content of the exhaust or of the EGR unless there is a LP-EGR system that introduces LP-EGR upstream of the turbocharger compressor inlet, and hence the condensate in the charge air cooler may be a function of the moisture content of the air entering the charge air cooler (e.g., the humidity of the air), mass air flow, temperature of the charge air cooler, and pressure of the charge air cooler. The temperature of charge air cooler may include the temperature of the coolant flowing through the charge air cooler as well as the temperature at the inlet of the charge air cooler. However, if LP-EGR is introduced into the intake air upstream of the compressor, the amount of LP-EGR may also be used to determine the amount of formed condensate in the charge air cooler.

Turning now to FIG. 4, it illustrates a method 400 for estimating the amount of evaporated condensate in the EGR cooler based on the condensation model described above. Condensate may form within the cooler during some conditions (e.g., low mass air flow, relatively cool exhaust entering the cooler). However, under other conditions, condensate that previously formed within the cooler may evaporate and/or be entrained by the exhaust gas flowing through the cooler. Thus, to get an accurate overall determination of the total amount of accumulated condensate within the EGR cooler, both the amount of formed and evaporated condensate is estimated. Method 400 may be carried by controller 12 according to instructions stored thereon.

Method 400 includes, at 402, determining the maximum theoretical EGR saturation moisture content based on EGR cooler temperature, pressure, and EGR specific humidity. The maximum theoretical EGR saturation moisture content is determined using the same equation described with respect to FIG. 3 for calculating the moisture content in the EGR after exiting the cooler:

$$MC_{EGR} = MAF*0.622*P + 3.07 \times 10^2 (T_{outlet}) + 6.47/(\text{CoolerPressure} - P)$$

Thus, the moisture content in the EGR after passing through the cooler gives an approximation of the amount of moisture that was not deposited in the cooler, and the amount of condensate that evaporated from the cooler. At 404, it is determined if the maximum theoretical EGR saturation moisture content is less than the current EGR flow rate. If the maximum EGR saturation moisture content is not less than the current EGR flow rate, then it may be assumed that the gas flow of the EGR could be comprised entirely of steam, and method 400 proceeds to 406 to set the amount of evaporated condensate in the cooler as being equal to the EGR flow rate.

If the maximum theoretical EGR saturation moisture content is greater than the EGR flow rate, method 400 proceeds to 408 to set the amount of evaporated condensate as being equal to the maximum theoretical EGR saturation moisture content. Method 400 then ends.

Thus, method 400 provides for determining the amount of evaporated condensate in an EGR cooler. As explained previously, the amount of evaporated condensate may also include the amount of condensate entrained by the exhaust gas flowing through the cooler. The amount of entrained condensate may be based on the flow velocity of the exhaust gas through the cooler. Furthermore, a similar method may be applied to determine the amount of evaporated condensate in a charge air cooler. The evaporated condensate in a charge air cooler may be determined similarly as in the EGR cooler, using mass air flow, temperature at the outlet of the charge air cooler, pressure in the charge air cooler, and the saturation pressure of the intake air at the given cooler outlet temperature.

FIG. 5 is a flow chart illustrating a method 500 for removing accumulated condensate in an EGR cooler. Method 500 may be carried out by controller 12 according to instructions stored thereon in response to an indication that the amount of accumulated condensate, determined based on the methods 300 and 400 presented above, is above a threshold. Method 500 removes accumulated condensate by increasing the amount of EGR flowing through the cooler. However, in some embodiments, in order to avoid disrupting the EGR control strategy, the EGR for condensation control may only be increased during select conditions, described below.

Method 500 comprises, at 502, determining if accumulated condensate in the EGR cooler is below the threshold, similar to the determination described above with respect to FIG. 2. If the accumulated condensate is below the threshold, method 500 proceeds to 504 to flow EGR according to a first schedule. The first schedule may be the standard EGR flow schedule that sets the EGR rate based on engine speed and load in order to maintain intake oxygen at a designated fraction for controlling emissions. Method 500 then returns.

If the accumulated condensate is not below the threshold, method 500 proceeds to 506 to flow EGR according to a second, different schedule to remove the condensate and/or prevent further accumulation of the condensate in the cooler. Flowing EGR according to the second schedule may include flowing EGR at a rate selected from a desired table, as indicated at 508. The desired table may be any EGR rate table already stored in the memory of the controller, or it may be an EGR rate table specifically designated for condensate removal. The selected EGR rate may be modified at 510 based on a condensate model (e.g., the model described above with respect to FIGS. 3 and 4) to flow EGR under non-condensate forming conditions. The selected EGR rate may be further modified at 512 to maintain combustion stability. As the EGR for condensate removal may be activated during conditions in which EGR is not normally activated, the selected EGR rate may be modified to ensure that combustion instability does not occur, to ensure that any control strategies that are based on the amount of EGR are not disrupted, and to ensure that the EGR will not cause additional condensate accumulation rather than removal. In this way, for a given engine speed and load point, the amount of EGR routed to the intake when accumulated condensate is below the threshold may be different than the amount routed to the intake when the accumulated condensate is above the threshold.

In some embodiments, EGR may flow according to the second schedule only when allowable due to constraints already placed on the EGR system. For example, if EGR is currently activated, it may remain on the first schedule rather than switch to the second schedule. Further, if EGR is deactivated to prevent degradation, it may remain deactivated. Thus, as optionally indicated at 514, EGR may flow according to the second schedule only if EGR is currently deactivated due to emission control. EGR is typically activated to maintain a lower intake oxygen concentration, which in turn lowers combustion temperatures in order to reduce emissions, such as NOx. Under some conditions, such as when the engine is operating following a cold start, or during conditions of relatively high engine load and/or speed, EGR may be deactivated, as NOx control is not indicated, or because flowing EGR under those conditions may cause misfire or other unstable combustion conditions. If EGR is currently activated, adjusting the amount of EGR to remove the condensate may interfere with standard NOx control strategies, and EGR may be set according to the standard, first schedule. Additionally, EGR may be currently deactivated to prevent an over-temperature event or other degradation. If EGR is currently deactivated because of or to avoid degradation to the engine or other components, EGR cannot be activated for condensate control, as degradation to the engine or other components may occur as a result. Upon activating EGR to remove condensate, method 500 returns.

While method 500 adjusts an EGR valve in response to accumulated condensate in an EGR cooler, if the accumulated condensate in a charge air cooler exceeds a threshold, other engine actuators may be adjusted to remove the condensate from the charge air cooler. For example, a turbocharger wastegate may be adjusted to increase or decrease boost pressure. In another example, the throttle may be adjusted to increase the velocity of intake air passing through the charge air cooler.

Thus, the methods described above provide for detecting and removing condensate in an engine heat exchanger, specifically an EGR cooler or a charge air cooler. The above methods rely on a condensation model that predicts both formed condensate and evaporated condensate. The model described above with respect to FIGS. 3 and 4 utilizes the free stream temperature of the gas flowing through the heat exchanger, and does not consider the effect of the temperature of the heat exchanger walls or interface. However, the model may be modified to account for those effects. Further, the model output may be further adjusted based on the coolant temperature of the EGR cooler, gas temperature, and other factors.

In one embodiment, a method for an engine comprises adjusting an engine actuator based on estimated accumulated condensate in an engine heat exchanger, the estimated accumulated condensate based on an amount of formed condensate and an amount of evaporated condensate within the engine heat exchanger over a given duration.

In a first example, the actuator may comprise a wastegate, and the heat exchanger may comprise a charge air cooler. The amount of formed and evaporated condensate within the charge air cooler may be estimated based on moisture content of intake air entering the charge air cooler, a temperature of the charge air cooler, boost pressure, and mass air flow through the charge air cooler, and the moisture content of the intake air may be based on humidity, mass air flow, temperature, and pressure of the intake air upstream of the charge air cooler.

In a second example, the actuator may comprise an exhaust gas recirculation (EGR) valve, and the heat exchanger may comprise an EGR cooler. The amount of formed condensate within the EGR cooler may be estimated based on moisture content of exhaust routed to atmosphere and amount of EGR routed to the engine. The moisture content of the exhaust may be a function of moisture generated during combustion, moisture content of intake air routed to the engine, and moisture content of EGR routed to the engine; the moisture content of the intake air may be a function of intake air relative humidity, mass air flow, pressure, and temperature; and the moisture content of the EGR routed to the engine may be a function of mass air flow, EGR cooler outlet temperature, and EGR cooler pressure. The amount of evaporated condensate within the EGR cooler may be estimated based on mass air flow, EGR cooler outlet temperature, and EGR cooler pressure. The EGR valve may be adjusted based on the accumulated condensate in the EGR cooler so that the EGR valve is opened to increase the EGR routed to the intake.

In another embodiment, a method for an engine comprises adjusting an exhaust gas recirculation (EGR) valve based on estimated accumulated condensate in an EGR cooler, the estimated accumulated condensate comprising an amount of formed condensate and an amount of evaporated condensate within the EGR cooler over a given duration. The EGR valve may be opened to increase the EGR routed to the intake.

The amount of formed condensate in the EGR cooler may be determined based on moisture content of intake air entering the engine, moisture content of exhaust exiting the engine, moisture of EGR routed to the intake, and an amount of EGR routed to the intake. The amount of formed condensate in the EGR cooler may be further determined based on EGR cooler temperature, EGR cooler effectiveness, and EGR temperature. The amount of evaporated condensate in the EGR cooler may be determined based on mass air flow, EGR cooler outlet temperature, and EGR cooler pressure.

In a further embodiment, a method for an engine comprises estimating accumulated condensate in an EGR cooler based on formed and evaporated condensate within the EGR cooler, and if the accumulated condensate is above a threshold, adjusting an EGR valve during select conditions to increase the EGR routed through the EGR cooler to remove the accumulated condensate. The select conditions may include the EGR valve being in a fully closed position prior to the adjusting of the EGR valve. Adjusting the EGR valve to increase the EGR routed through the EGR cooler may further comprise adjusting the EGR valve to deliver an EGR amount selected based on engine operating conditions and further based on an amount of condensate predicted to accumulate in the EGR cooler. The amount of accumulated condensate in the EGR cooler may be further estimated based on coolant temperature of the EGR cooler.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
estimating an amount of accumulated condensate based on an amount of formed condensate and an amount of evaporated condensate within an exhaust gas recirculation (EGR) cooler of the engine over a given duration; and
increasing EGR flow responsive to the estimated amount of accumulated condensate within the EGR cooler.

2. The method of claim 1, further comprising if the estimated amount of accumulated condensate is below a threshold, flowing EGR according to a first schedule, and if the estimated amount of accumulated condensate is above the threshold, flowing EGR according to a different, second schedule.

3. The method of claim 1, wherein the amount of formed condensate in the EGR cooler is determined based on moisture content of intake air entering the engine, moisture content of exhaust exiting the engine, moisture of EGR routed to an intake, and an amount of EGR routed to the intake, EGR cooler temperature, EGR cooler effectiveness, and EGR temperature.

4. The method of claim 1, wherein the amount of evaporated condensate in the EGR cooler is determined based on mass air flow, EGR cooler outlet temperature, and EGR cooler pressure.

5. A method for an engine, comprising:
estimating accumulated condensate based on an amount of formed condensate and an amount of evaporated condensate within an engine heat exchanger over a given duration; and
adjusting an engine actuator based on the estimated accumulated condensate in the engine heat exchanger.

6. The method of claim 5, wherein the actuator comprises a wastegate, and wherein the heat exchanger comprises a charge air cooler.

7. The method of claim 6, further comprising estimating the amount of formed condensate and the amount of evaporated condensate within the charge air cooler based on moisture content of intake air entering the charge air cooler, a temperature of the charge air cooler, boost pressure, and mass air flow through the charge air cooler.

8. The method of claim 7, wherein the moisture content of the intake air is based on humidity, mass air flow, temperature, and pressure of the intake air upstream of the charge air cooler.

9. The method of claim 5, wherein the actuator comprises an exhaust gas recirculation (EGR) valve, and wherein the heat exchanger comprises an EGR cooler.

10. The method of claim 9, further comprising estimating the amount of formed condensate within the EGR cooler based on moisture content of exhaust routed to atmosphere and amount of EGR routed to the engine.

11. The method of claim 10, wherein the moisture content of the exhaust is a function of moisture generated during combustion, moisture content of intake air routed to the engine, and moisture content of EGR routed to the engine.

12. The method of claim 11, wherein the moisture content of the intake air is a function of intake air relative humidity, mass air flow, pressure, and temperature.

13. The method of claim 10, wherein the moisture content of the EGR routed to the engine is a function of mass air flow, EGR cooler outlet temperature, and EGR cooler pressure.

14. The method of claim 10, further comprising estimating the amount of evaporated condensate within the EGR cooler based on mass air flow, EGR cooler outlet temperature, and EGR cooler pressure.

15. The method of claim 9, wherein adjusting the EGR valve based on the accumulated condensate in the EGR cooler further comprises opening the EGR valve to increase EGR routed to an intake.

16. A method for an engine, comprising:
estimating accumulated condensate in an EGR cooler based on formed condensate and evaporated condensate within the EGR cooler; and
if the accumulated condensate is above a threshold, adjusting an EGR valve during select conditions to increase EGR routed through the EGR cooler to remove the accumulated condensate.

17. The method of claim 16, wherein the select conditions comprise the EGR valve being in a fully closed position prior to the adjusting of the EGR valve.

18. The method of claim 16, wherein adjusting the EGR valve to increase the EGR routed through the EGR cooler further comprises adjusting the EGR valve to deliver an EGR amount selected based on engine operating conditions and further based on an amount of condensate predicted to accumulate in the EGR cooler.

19. The method of claim 16, wherein the amount of accumulated condensate in the EGR cooler is further estimated based on coolant temperature of the EGR cooler.

* * * * *